United States Patent
Murakami

(10) Patent No.: US 7,248,743 B2
(45) Date of Patent: Jul. 24, 2007

(54) IMAGE PROCESSING APPARATUS, MOBILE TERMINAL DEVICE AND IMAGE PROCESSING COMPUTER READABLE PROGRAM

(75) Inventor: Tomokazu Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 694 days.

(21) Appl. No.: 10/641,111

(22) Filed: Aug. 15, 2003

(65) Prior Publication Data

US 2004/0202377 A1 Oct. 14, 2004

(30) Foreign Application Priority Data

Apr. 8, 2003 (JP) ............................ 2003-103539

(51) Int. Cl.
- G06K 9/36 (2006.01)
- G06K 9/00 (2006.01)
- G09G 3/36 (2006.01)

(52) U.S. Cl. ..................... 382/251; 382/168; 382/162

(58) Field of Classification Search ................ 382/270, 382/271, 273, 274, 168, 169, 251; 358/519, 358/521, 522, 520; 348/631, 671, 672, 254; 345/88, 89, 589, 596

See application file for complete search history.

(56) References Cited

U.S. PATENT DOCUMENTS

| | | | | |
|---|---|---|---|---|
| 6,018,589 A | * | 1/2000 | Hyodo | 382/168 |
| 2001/0033260 A1 | * | 10/2001 | Nishitani et al. | 345/87 |
| 2004/0095500 A1 | * | 5/2004 | Sato et al. | 348/340 |

FOREIGN PATENT DOCUMENTS

JP    10-164377    6/1998

* cited by examiner

*Primary Examiner*—Yon J. Couso
(74) *Attorney, Agent, or Firm*—Mattingly, Stanger, Malur & Brundidge, P.C.

(57) ABSTRACT

An image processing apparatus includes a gradation quantization processing in a case of performing a region dividing processing in the animation of a moving picture and in an object extraction, in which frequency histograms are created for each frame, a judgment is performed whether a quantization reference value is re-calculated by comparing the frequency histograms, in the case of performing the re-calculation, and a quantization reference value is successively obtained in accordance with the product of the frequency histograms and the error coefficient, thereby realizing a high-speed high-quality image process.

10 Claims, 7 Drawing Sheets

IMAGE PROCESSING APPARATUS, MOBILE TERMINAL DEVICE AND IMAGE PROCESSING COMPUTER READABLE PROGRAM

BACKGROUND OF THE INVENTION

1. Field of the Invention

The present invention relates to an image processing apparatus for processing a moving picture and a program for causing a computer to execute an image processing method and in particular, to a method for image gradation quantization and animation, region division processing, and object extraction processing.

2. Description of the Related Art

An image processing technique is used in various systems such as a monitoring system and a vehicle automatic operation system. Among them, the gradation quantization processing is a processing for reducing the number of levels of image component value associated with image color information (for example, pixel values of components of RGB and components of YUV) and reduce the number of colors in an image. For example, a full color image in which each of RGB is expressed in 256 gradations is reduced to about 10 gradations for each color. The gradation quantization processing is performed as a pre-stage of region dividing processing for dividing a region into regions each having similar colors in an object extraction processing for isolating a person, a vehicle, or the like from a picked up image.

Moreover, a digital camera and a video camera are widely spread in people. A user performs image processing for processing/editing an image picked up by a PC. It is expected to develop an animation technique for transforming a picked-up moving picture into an animation cell image and a technique for attaching a character, a symbol, and a picture onto the image or cut off a particular portion from an image and combine it with another image. In the moving picture animation technique, smoothing and contour detection/emphasis processing accuracy are dominant elements for image impression but the gradation quantization as the pre-stage is also important.

Furthermore, most of the recently developed mobile telephones have a built-in camera and can record a moving picture in real time. With such a sophisticated function, such a sophisticated application is expected that the picked up image is made into animation in real time or a commodity is imaged and information associated with it is collected from a network. In order to perform such a sophisticated image processing by a small-size device, it is necessary to develop a method capable of performing a basic processing such as gradation quantization at a higher speed and with a preferable final output result.

The conventional gradation quantization processing may be a method for multi-dimensional processing in a color component (image component space) or a method for processing for each image component. The multi-dimensional processing method may be, for example, a vector quantization method which is characterized in that the color reproduction after quantization can be improved. On the other hand, the method for processing for each image component may be a method for performing analysis by repetition processing, a method for performing division so as to obtain a constant histogram area, a method for dividing the image component level at a constant interval, or the like.

For example, the method using the repetition processing may be the K-average clustering method. Firstly, a reference value (level value after gradation quantization) is appropriately decided for each image component and while moving it with a constant width, a sum of an error with respect to the image component value (pixel value) is repeatedly calculated, so as to obtain the combination of the reference values to minimize the sum.

Furthermore, as a method for performing division to obtain a constant histogram area, there is a method to decide a reference value so that the area of the frequency histogram of the image component value is constant at each reference value periphery (for example, JP-A-10-164377).

Thus, there are several types of gradation quantization. For a still image, a method having a high accuracy although the processing speed is slow has been used. For a moving picture, a method for high-speed processing in spite of low accuracy has been used.

The vector quantization method has a problem that processing is complicated, requiring a plenty of time and cannot be applied to the real time processing of a moving picture. Moreover, the K-average clustering method also has a problem that a plenty if time is required like the multi-dimensional processing method and cannot be applied to a moving picture. Moreover, when this method is applied to the animation, there is a problem that since the reference value changes for each frame, the color an luminance change appear as flashing of the image, causing a flicker.

Moreover, the aforementioned method disclosed in JP-A-10-164377 does not consider the error between the reference value and the image component value and is valid to a certain extent when a histogram has one peak but the quality is significantly deteriorated in other cases. Moreover, in the same way as the aforementioned method, a flicker may be caused.

The method for dividing a level at a certain interval can perform a high-speed processing and since the reference value is constant for all the frames, no flicker is caused. However, this method does not answer to the image change and the color reproduction is not preferable. This method cannot be applied to animation and obstacle extraction where the number of gradation should be reduced to a small number.

As has been described above, there has been no gradation quantization which can perform a high-speed processing and maintain a high-quality of moving picture.

SUMMARY OF THE INVENTION

An object of the present invention is to provide an image processing apparatus, a mobile terminal device and an image processing computer readable program capable of high-speed high-quality gradation quantization processing which is required for animation of a moving picture in real time or an object extraction by image recognition through region division on a system having a low processing ability such as a mobile telephone.

In order to realize the object, there is an aspect that an image processing apparatus used comprises: an image input unit for inputting an arbitrary moving picture, a memory device for holding the moving picture which has been input, a processor for performing gradation quantization processing of a frame constituting the moving picture, and an image output unit for outputting the moving picture which has been subjected to the gradation processing. And the processor modifies the reference value of the gradation quantization processing for each of the frames constituting the moving picture.

More specifically, the processor modifies the reference value of the gradation quantization processing by comparing a part or whole of the frequency histogram of the image component value associated with color information for the plurality of frames constituting the moving picture.

Other objects, features and advantages of the invention will become apparent from the following description of the embodiments of the invention taken in conjunction with the accompanying drawings.

DETAILED DESCRIPTION OF THE EMBODIMENTS

Description will now be directed to embodiments of the present invention with reference to the attached drawings.

Figure 1:
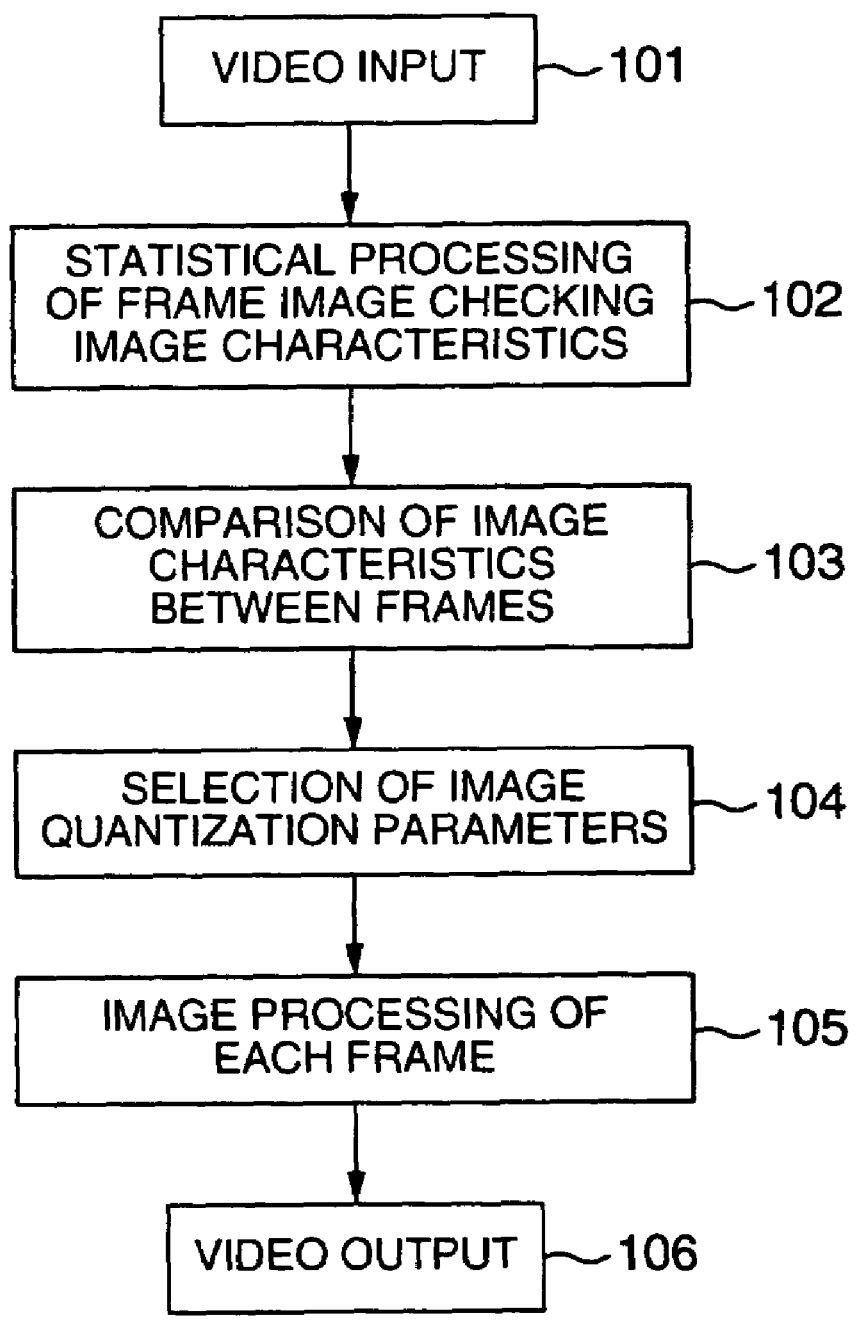
FIG. 1 is a flow chart explains an image processing method according to an embodiment of the present invention.

FIG. 1 shows an image processing method according to an embodiment of the present invention and its technical features will be explained below.

Firstly, in step (101), an image is input. The image may be one imaged by a camera or a stream stored, transmitted, or broadcast. The image which has been input is stored in a memory for each frame. A plurality of frames may be stored or one frame may be stored. Next, control is passed to step (102).

In step (102), image statistical processing is performed for each frame. The image statistical processing includes a frequency histogram creation for each pixel component value (pixel value) of RGB and YUV and calculation of various statistical information on the image such as the maximum value, the minimum value, and the center value. This step includes a color component transform for image processing. Next, control is passed to step (103).

In step (103), image characteristic amount is compared between frames. The image characteristic amount is a value indicating the image characteristic obtained by the statistical processing in step (102). In this step, this image characteristic amount is compared between frames. Next, control is passed to step (104).

In step (104), a reference value for gradation quantization is adjusted. According to the comparison result determined by the preceding step (103), a reference value or parameter for each frame is determined. The reference value or parameter for gradation quantization is the level value of the image component of RGB and YUV. When the preceding step (103) decides that the characteristic amount change between frames is small, the same reference value as the preceding frame is used and when the change is large, a new reference value is calculated and set. Next, control is passed to step (105).

In step (105), image processing for each frame is performed. According to the reference value decided by the preceding step (104), gradation quantization is performed. This step includes contour emphasis processing and smoothing in animation, region division and region combination in the object extraction processing, filter processing such as shape matching, and color component transform for image display. Next, control is passed to step (106).

In step (106), an image which has been processed is output. The output may be performed to a display or written/stored in a file. Thus, a sequence of processes is complete.

Figure 2:
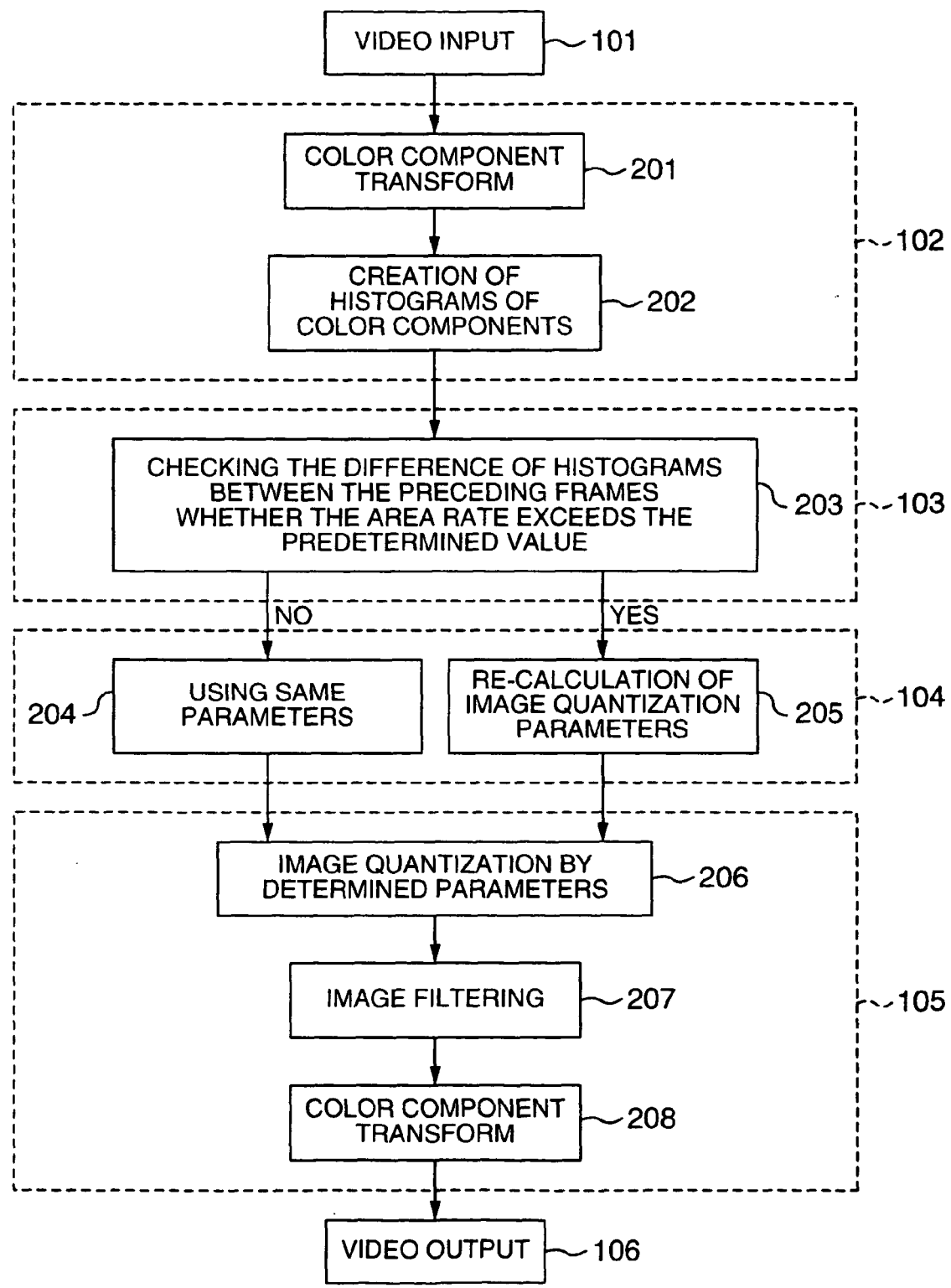
FIG. 2 is an explanatory diagram showing details of the image processing method according to the embodiment of the present invention.

Next, with reference to FIG. 2, detailed explanation will be given on the embodiment of the present invention. Explanation will be given on a method as an example in which an imaged moving picture is input and each frame is made into animation.

In step (101), an image is input and control is passed to step (201).

In step (201), color component transform is performed. For example, an image picked up by a CCD (charge coupled device) has RGB image components as a color component. Here, as an example, a color component is transformed from RGB to YUV. A distance between two points in the YUV space is nearer to the color distance felt by human sight than in the RGB space. For this, by performing processing in the YUV space, it is possible to reduce a color error generated by quantization and viewed by a human. There is also a CIE-L*a*b* space considering the human psychological color distance. However, this complicates the transform processing and here, the YUV space is used. The transform method may be an ordinary method. The color component transform may not be performed. Next, control is passed to step (202).

In step (202), a frequency histogram is created for each image component. The frequency histogram is used as the image characteristic amount in FIG. 1. Since transform into the YUV space has been performed in the aforementioned step (201), a frequency histogram of a current frame is created for each of YUV and stored in memory. The frequency histogram may be created either for all of the YUV or some of them, for example, only for Y. When the histogram is created for all of the YUV, in the later step, it is possible to accurately judge the image change when performing comparison between frames. On the other hand, when the histogram is created only for Y, it may not possible to grasp when only a color is changed between frames such as illumination condition within the image. However, it is possible to grasp image change accompanying luminance change such as object movement and save memory and perform processing at a high speed because no other histograms are created. Next, control is passed to step (203). Step (201) and step (203) correspond to step (102).

In step (203), the frequency histograms of the current frame and the preceding frame are compared. In this step, by comparing information on the image which has been subjected to statistical processing, it is judged how the current frame of the moving picture has changed as compared to the preceding frame. When a larger change is present, the reference value is re-calculated. Otherwise, no re-calculation is performed and the same reference value as the preceding frame is used. Comparison may be performed for all of the YUV or only for Y. The histograms of the both frames are superimposed and are compared to calculate the area of the different parts of two histograms to determine their percentage of the area of the histogram (i.e., total number of pixels of one frame). For example, when the percentage exceeds 30%, it us judged to perform re-calculation of quantization reference value, and when the ratio is below 30%, the same reference value as the preceding frame is used. When comparison is performed for a plurality of components, re-calculation may be performed if all the components exceed a certain value or if one of the components exceeds a certain value. When a plenty of noise is present because of the image condition used, the processing becomes stable when judgment is performed when all the components exceed a certain value. When noise is small and it is necessary to be sensitive to a color and luminance change, judgment is performed when one of the components exceeds a certain value. The certain value as a judgment condition is predetermined in advance. The value may be dynamically changed depending on the condition. It is also possible to provide an interface so that a user can set as is necessary.

Figure 4:
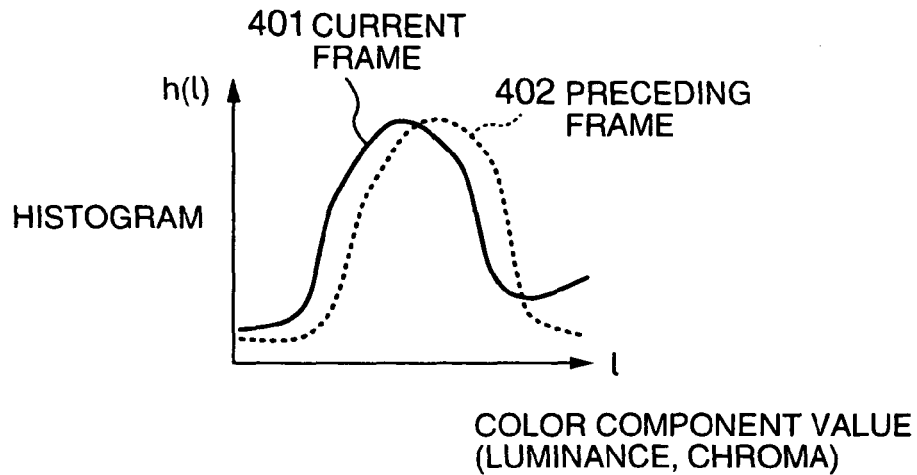
FIG. 4 is a characteristic diagram explaining an interframe image information comparison method used in the present invention.

Explanation will be given on the method of calculating the ratio of the area of the different parts of the histogram with reference to FIG. 4. FIG. 4 shows a frequency histogram h(l) concerning an image component value 1, of luminance and chroma. A graph (401) represents a histogram of the current frame and a graph (402) represents a histogram of the preceding frame. When the luminance value Y is to be compared, if the Y range of the input image is 0 to 255, absolute values of differences of the histograms of the both frames in this range are totaled and divided by the total number of pixels of one frame. This step corresponds to step (103). Here, the histogram area is compared. It is also possible to determine whether the peak values of the histograms are at a distance exceeding a certain value or to compare the frequency upper points to determine whether they are identical so as to obtain a characteristic amount between the frames. Instead of simple histogram comparison, it is also possible to compare histograms multiplied by an error coefficient which will be detailed later. Moreover, it is also possible to determine a reference value according to a reference value determination method which will be detailed later and stores it so that reference values are compared for judgment. Thus, by performing comparison between image statistical information instead of comparing the images themselves, it is possible to reduce the memory required for storing data as compared when storing the image. Next, control is passed to step (204) or step (205) according to the judgment.

In step (204), the reference value is set to the same reference value of the preceding frame. Next, control is passed to step (206).

In step (205), re-calculation of the quantization reference value is performed. As the reference value calculation method, an error peak trace method which will be detailed later is used in this embodiment. Next, control is passed to step (206). Step (204) and step (205) correspond to step (104).

In step (206), by using the reference value set in the preceding step, gradation quantization of each frame is performed. The gradation quantization is matched with the nearest reference value in which the level value is set for each pixel component of all the pixels in the image, i.e., YUV here. For example, when the Y reference value is (0, 128, 255), the U reference value is (−50, 0, 50), and the V reference value is (−30, 10, 40), the pixel of [Y, U, V]=[10, 15, 15] is quantized into [0, 0, 10]. Next, control is passed to step (207).

In step (207), filter processing is performed. The filter processing is image processing including contour emphasis processing and smoothing in animation processing, region division and region combination in an object extraction processing, shape matching and the like. For example, in the contour emphasis processing in the animation, the edge emphasis processing used in the ordinary image processing may be performed. In this invention, the UV component of each pixel is plotted as a vector from the origin onto the UV 2-dimensional plane. When the angle defined by the vectors of the target pixel and a peripheral pixel is above a predetermined angle, it is judged that a contour is present at the pixel boundary of them and the Y component value is divided by a predetermined value so as to display the contour concentrated and emphasize it. As for the smoothing, the median filtering is used for the Y component and averaging of eight vicinity pixels is performed for the UV component. Moreover, it is also possible to apply the ordinary filter processing such as the none-sharp masking and noise removal. Next, control is passed to step (208).

In step (208), color component transform is performed. Here, for pixel display, the color component is returned from the YUV to RGB. Next, control is passed to step (106). Steps (206) (207) (208) correspond to step (105).

In step (106), an image is output and a series of operation is complete.

Figure 3:
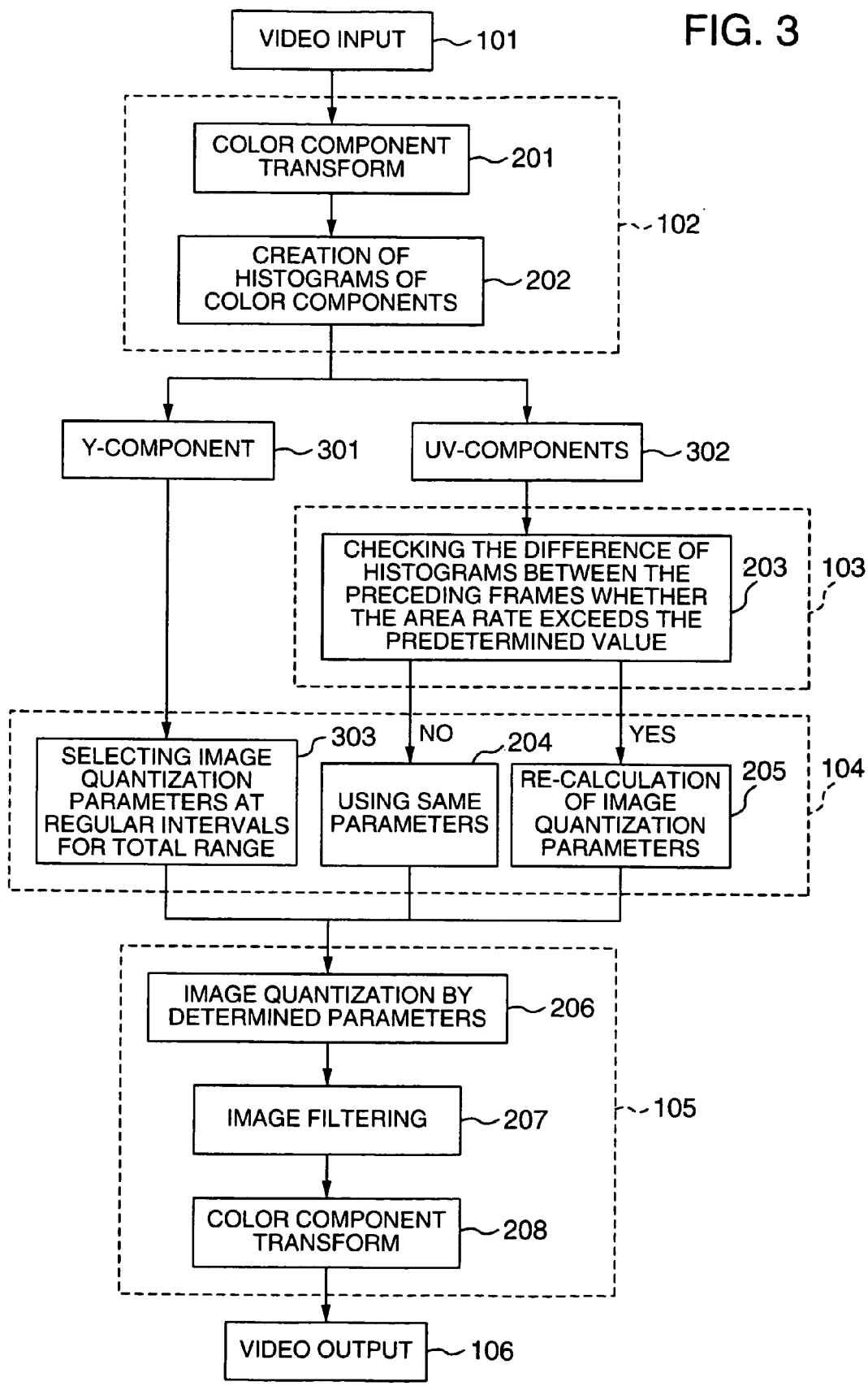
FIG. 3 is an explanatory diagram showing an image processing method according to another embodiment of the present invention.

Description will now be directed to another embodiment of the present invention with reference to FIG. 3. This embodiment is characterized in that the Y component of the YUV space is processed by other method.

After an image is input in step (101), control is passed to step (201) and then to step (202). Steps (201) and (202) correspond to the aforementioned step. Next, for the Y component among the YUV image components, control is passed to step (303) and for the UY components, control is passed to step (203).

In step (303), a reference value is set at an identical interval in the Y component range. For example, when the Y component range is 0 to 255 and five reference values are decided, they are set to (0, 64, 128, 192, 255). Here, the Y component alone is handled separately because the human sense of sight differs between the luminance component and the chroma component and more sensitive to the luminance change than to the chroma change. Depending on an application used, there is a case when it is better to handle the luminance and the chroma by the same method and there is a case when it is better to handle them separately. For example, when the reference value is set at an identical interval for the luminance, if the number of the reference values is small, much noise is present in the entire image as compared to the error peak trace method which will be detailed later, but the edge in a small portion can easily be stored. Next, control is passed to step (206).

Step (203) performs the processing similar to the aforementioned processing for the UV components. After this, steps (204), (205), (206), (207), (208), and (106) are performed in the same way as has been described above.

Figure 5:
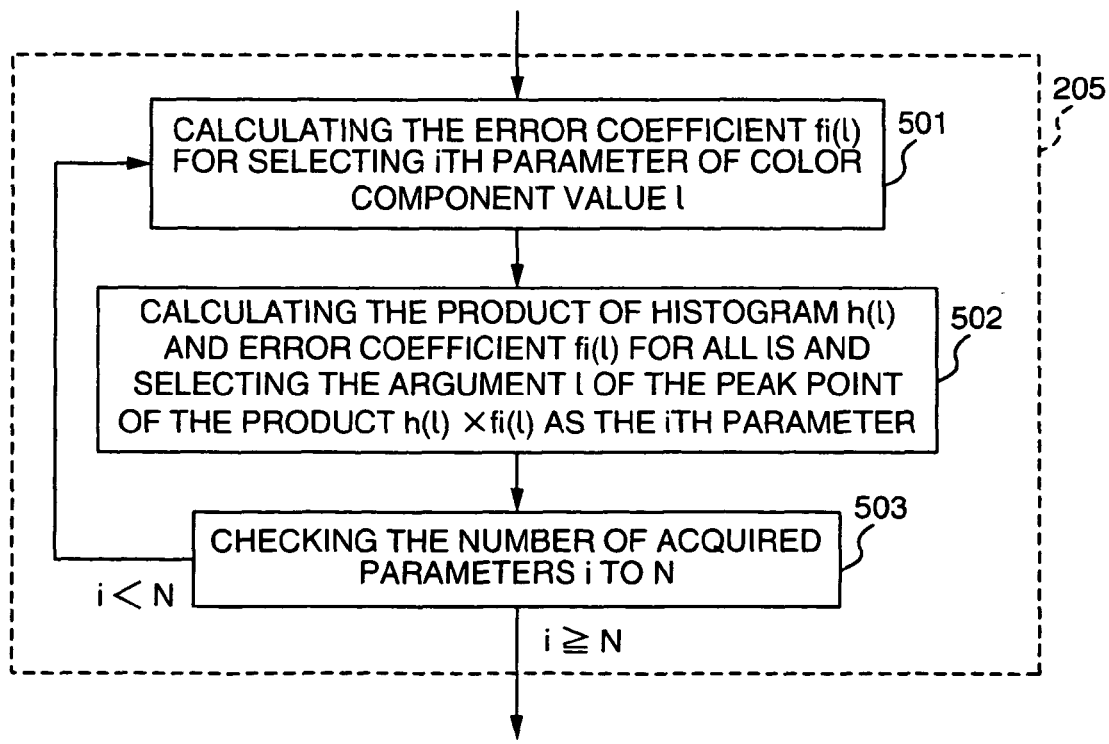
FIG. 5 is a flow chart showing detailed of the image processing method according to the embodiment of the present invention.

Next, referring to FIG. 5, detailed explanation will be given on the method for calculating the quantization reference value according to the present invention. This correspond to step (205) and is called the error peak trace method.

When calculating a quantization reference value, firstly, in step (501), an error coefficient fi(l) is calculated. The fi(l) is an error coefficient concerning the image component value 1 of the luminance and chroma for calculating the i-th reference value. For example, as the error coefficient fi(l), Equation 1 is used.

[Equation 1]

$$f_i(l) = \begin{cases} 1 & \dots i = 1 \\ \min_{l,j<i}[|l - s_j|]/L & \dots i \neq 1 \end{cases} \quad (1)$$

Here, Si is the i-th reference value, j is a variable indicating the number of reference value smaller than i, and L is a range width of the image component 1. The range width indicates a width each component value may have. In the Equation 1, when calculating the first reference value, f1(l)=1 and the error coefficient is constant for all the 1 and when calculating the second reference value and after, for all the 1, the nearest distance with respect to the reference values acquired is divided by the range width to obtain the error coefficient. Here, the error coefficient is as shown in Equation 1. It is also possible to multiply this by a constant coefficient so as to be proportional to this. That is, it is also possible to use a value proportional to the distance to the nearest reference value from each image component value. Next, control is passed to step (502).

In step (502), by using the histogram h(l) and the error coefficient fi(l) obtained in the preceding step (501), for all the component 1, the products fi(l)×h(l) are calculated and the 1 having the maximum value is made the i-th reference value Si. The product of the histogram and the error coefficient is a value indicating the error when gradation quantization is performed by using the reference values acquired. By selecting its peak, it is possible to acquire an image component value having the maximum error. This can be expressed by Equation 2 as follows.

[Equation 2]

$$S_i = \{l \mid \max_l[h(l) \times f_i(l)]\} \quad (2)$$

When there are more than one maximum values, the an arbitrary value such as median is selected. Next, control is passed to step (503).

In step (503), the number N of the reference values to be acquired is compared to the number i of the reference values which have been acquired. When all the reference values have been acquired, the processing is terminated. When not all the reference values are acquired, the number i is incremented by one and control is returned to step (501). Here, judgment is made according to the number of the reference values to obtain the end condition. However, it is also possible to judge whether the product fi(l)×h(l) of the histogram h(l) and the error coefficient fi(l) exceeds a predetermined value, so that when a part exceeds the predetermined value control is returned to step (501) to continue acquisition of the reference values and otherwise, the processing is terminated. Moreover, it is also possible to total the products fi(l)×h(l) of the histogram h(l) and the error coefficient fi(l) all the 1 and judgment is made whether the total exceeds a predetermined value, so that when a part exceeds the predetermined value, control is returned to step (501) to continue the acquisition of the reference value and otherwise, the processing is terminated. Since the product of the histogram and the error coefficient indicates an error amount caused by the gradation quantization in the image, when these methods are used, it is possible to adjust the image quality after quantization depending on the predetermined value.

Next, referring to FIG. 6, detailed explanation will be given on the error peak trace method.

Figure 6:
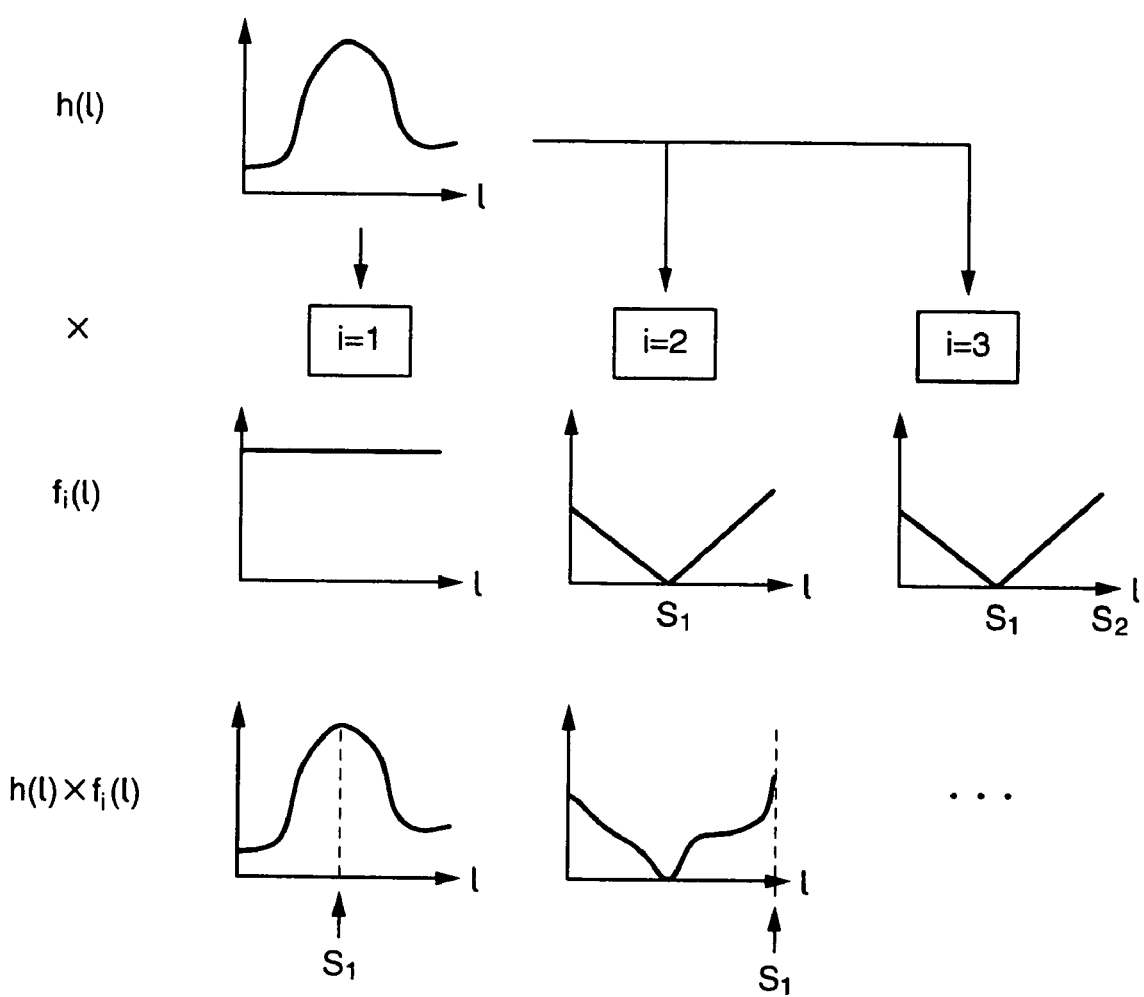
FIG. 6 is an explanatory diagram explaining a gradation reference value calculation method used in the present invention.

FIG. 6 explains the method for calculating the first to third reference values and error coefficients. Firstly, when calculating the first reference value, i.e., i=1, f1(l)=1. That is, f1(l)×h(l) is equal to h(l) and the calculation of the peak of this according to Equation 2 is identical to the calculation of the level value which is the peak of the histogram. This is set as the first reference value. Next, the second error coefficient is calculated from Equation 1. Since Equation 1 uses as an error the distance from the nearest reference value among the reference values which have been selected, the error coefficient of f2(l) makes a V-shaped graph based on the reference value S1 as shown in the figure. This is multiplied by the histogram value according to Equation 2 so as to obtain the image component value of the maximum error and the peak is traced to select the second reference value S2. The third reference value and after are obtained in the same method.

As another method, the first reference value may not be the histogram peak but the image component range center or the bisecting point value which is the level value at the position bisecting the frequency histogram area and Equation 1 may be used for i ≧2. Since the error peak trace method uses different reference values selected according to the setting of the initial value, by varying the initial value according to the condition, it is possible to adjust the image quality according to the application used.

Moreover, instead of using the frequency histogram simply as h(l), it is possible to use a weighted frequency histogram created by increasing the weight toward pixel at the screen center when calculating the frequency. By using this method, it is possible to increase the color reproduction of an object at the center of the screen after the gradation quantization as compared to the periphery.

Next, referring to FIG. 7, an explanation will be given on an image processing apparatus according to an embodiment of the present invention.

The image processing apparatus according to the present invention includes an image input unit (701), a memory device (713), a processor device (714), and an image output unit (702).

The image input unit (701) is means for inputting a moving picture. The moving picture may be an image picked up by a camera or a stream stored, transmitted, or broadcast. The images which have been input are stored in a frame memory (703) in a memory device (713) for each frame.

The image output unit (702) is means for outputting a moving picture. The output may be display on a display or writing/storage into a file.

The memory device (713) is a memory for storing a frame image and information associated with this. The function of the memory device (713) is divided into a frame memory (703), a histogram memory (704), a comparison histogram memory (705), a reference value memory (706), and a filter processing memory (707).

The frame memory (703) stores a frame image for processing. It can store a plurality of frames or a single frame. The histogram memory (704) is a memory for creating and storing a histogram associated with each image component of the current frame. The comparison histogram memory (705) is a memory for storing a histogram of the preceding frame for comparison. The reference value memory (706) is a memory for storing a reference value for gradation quantization determined by the reference value decision method. The filter processing memory (707) is a memory used for the filter processing.

The processor device (714) is a processor for performing the image processing and the statistical calculation. The function of the processor device (714) is divided into a color transform unit (708), a histogram processing unit (709), a reference value calculation unit (710), a quantization unit (711), and a filter processing unit (712).

The color transform unit (708) modifies the image component associated with color information from RGB to YUV or vice versa. The color component transform may be performed by using an ordinary method. The histogram processing unit (709) checks pixels of the frame image, creates a frequency histogram for each image component, and stores it in the histogram memory (704) and in the comparison histogram memory (705). The reference value calculation unit (710) calculates a reference value according to the reference value decision method and stores it in the reference value memory (706). The quantization unit (711) quantizes the image according to the gradation quantization method. The filter processing unit (712) performs the filter processing to the frame image.

Figure 7:
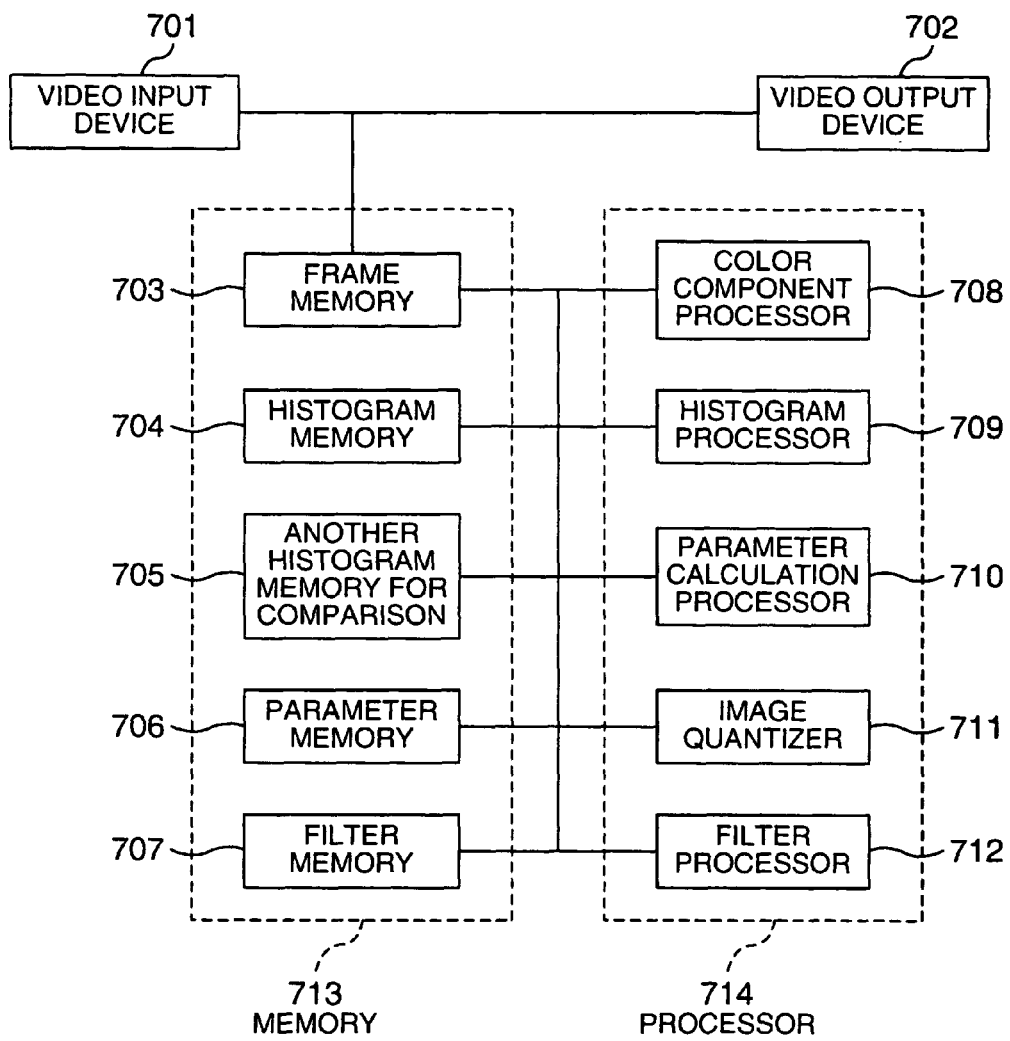
FIG. 7 is a block diagram showing an image processing apparatus according to an embodiment of the present invention.

In the image processing apparatus of FIG. 7, means for the respective functions are described for explanation. However, these means may be mounted together on a computer chip or realized by software.

Figure 8:
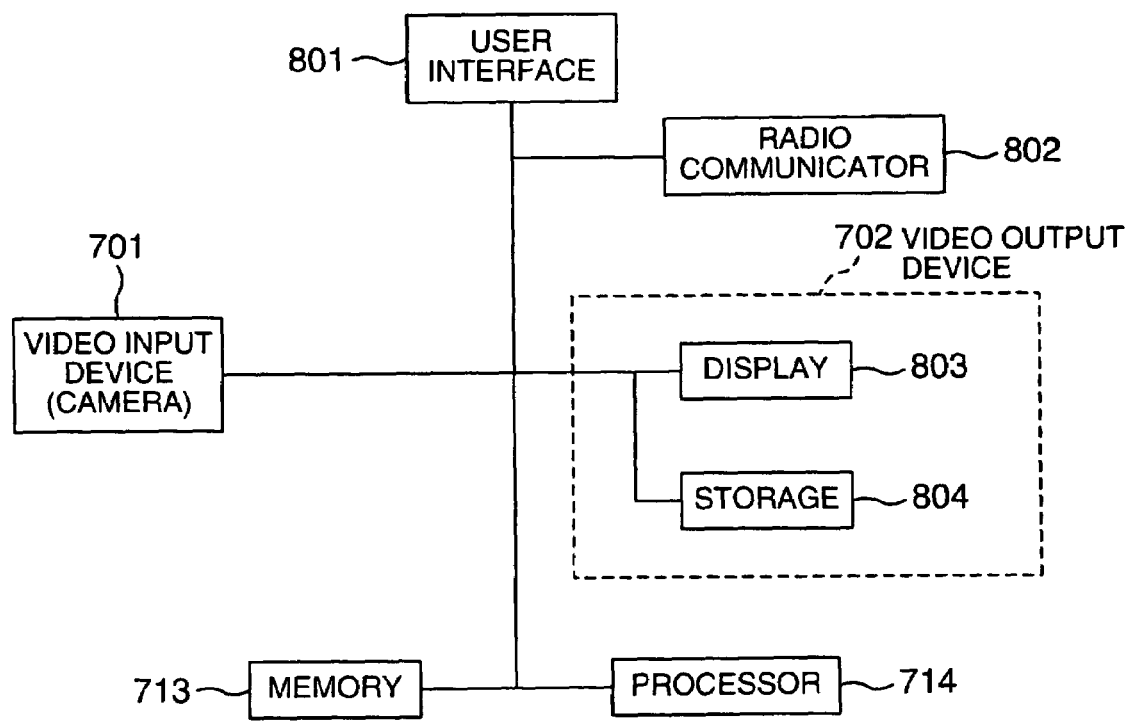
FIG. 8 is a block diagram showing an image processing apparatus according to another embodiment of the present invention.

FIG. 8 shows the processing method of the present invention applied to a mobile telephone having a camera. The image input unit (701) corresponds to the camera and the display (803) and the storage device (804) correspond to the image output unit (702). According to a user instruction from a user interface (801), the image input from the camera is subjected to the gradation quantization and filter processing according to the aforementioned method, displayed on a display screen (803) and store din a storage device (804). The moving picture which has been processed may be attached to a mail to be transmitted from a radio communicator (802). It is also possible to streaming-transmit the processed moving picture in real time from the radio communicator (802). The aforementioned gradation quantization method is not heavy as a processing not requiring CPU processing ability and can be operated in a small-size terminal such as a mobile telephone.

It should be noted that the aforementioned embodiment has been explained through real time animation and region division in an obstacle extraction but the present invention is not limited to this.

As has been explained above, in the field of image recognition, what has become important is the technique of object extraction for isolating an object such as a person and a vehicle from the image picked up and the technique for preparing animation from the moving picture.

The object extraction processing is realized by performing the gradation quantization processing, region dividing processing, shape matching, and the like in cooperation. The region division is a processing for dividing an image which has been subjected to color reduction by the gradation quantization, into a plurality of regions by grouping areas having similar colors. The shape matching is a processing for comparing each of the regions obtained by the region division to shape information held as data, thereby unifying the regions to verify whether a particular object is present. Thus, an image processing is realized by combining various processes. Among them, the basic processing such as gradation quantization is important.

Recently, there is software for acquiring a moving picture picked up by a video camera into a PC and editing it. By adding a simple effect to the moving picture picked up, it is possible to create a new moving picture. In future, an animation method is expected and as a pre-stage of it, realization of gradation quantization has become important.

By employing the present invention thus far explained to the gradation quantization, it is possible to realize gradation quantization capable of high-speed high-quality output. The present invention can be applied to an image processing apparatus such as the object extraction processing and animation so as to improve the performance of these devices and effectively operate them.

According to the present invention, in the gradation quantization processing when performing the animation of a moving picture or a region division in an object extraction, by comparing inter-frame histogram comparison, it is possible to suppress generation of flicker in the reproduced image. Moreover, by using the error peak trace method for successively calculating the quantization reference value according to the product of the frequency histogram and the error coefficient, it is possible to realize a gradation quantization processing capable of high-speed processing and obtaining a high-quality output image. Thus, it is possible to mount the moving picture animation function and the object recognition function on a small-size device such as a mobile telephone.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An image processing apparatus comprising:
   an image input unit which inputs a moving picture; and
   a processor which performs a gradation quantization processing of a frame constituting the moving picture which has been input,
   wherein the gradation quantization processing reduces a number of gradations in the frame, and
   wherein the processor modifies reference values of the gradation quantization processing which are level values constituting gradations after the gradation quantization.

2. An image processing apparatus as claimed in claim 1, wherein the processor modifies the reference value of the gradation quantization processing by comparing a part or whole of the frequency histogram of the image component value associated with color information for the plurality of frames constituting the moving picture.

3. An image processing apparatus comprising:
   an image input unit which inputs a moving picture;
   a processor which performs a gradation quantization processing of a frame constituting the moving picture which has been input; and
   an image output unit which outputs the moving picture which has been subjected to a gradation processing,
   wherein the gradation quantization processing reduces a number of gradations in the frame, and
   wherein the processor performs statistical processing associated with pixel values for each of the frames constituting the moving picture, compares a specific amount which have been obtained by the statistical processing for each of the frames between the frames, resets reference values of the gradation quantization processing which are level values constituting gradations after the gradation quantization, according to the comparison result, and performs a gradation quantization processing of the frames according to the reference values.

4. An image processing apparatus as claimed in claim 3, wherein the processor performs the statistical processing associated with the pixel values creates a frequency histogram for each of the frames, and performs a comparison to compare a part or whole of the histogram.

5. An image processing apparatus as claimed in claim 4, wherein the processor calculates the product of the histogram and the error coefficient, and sets a pixel value at the peak of the product to one of the reference values.

6. An image processing apparatus as claimed in claim 5, wherein the error coefficient used when calculating the i-th reference value is a value proportional to an absolute value of a difference between each pixel value and the nearest-to-the-pixel-value reference value among the reference values up to the (i−1)-th reference value.

7. A mobile terminal device comprising:
a camera which picks up a moving picture,
a control unit which performs a gradation quantization processing of a frame constituting the moving picture which has been picked up, and
a display unit which displays the moving picture which has been subjected to a gradation processing,
wherein the gradation quantization processing reduces a number of gradations in the frame,
wherein the control unit performs statistical processing associated with pixel values for each of frames constituting the moving picture, compares image specific amounts which have been obtained by the statistical processing for each of the frames, between the frames, resets reference values of the gradation quantization processing which are level values constituting gradations after the gradation quantization, according to the comparison result, and performs a gradation quantization processing of the frames according to the reference values, and
wherein the moving picture picked up by the camera is processed and displayed on the display unit.

8. A mobile terminal device as claimed in claim 7, wherein the control unit performs the statistical processing associated with the pixel values to create a frequency histogram for each of the frames, and performs a comparison to compare a part or whole of the histogram.

9. A mobile terminal device as claimed in claim 7, wherein the control unit calculates the product of the histogram and the error coefficient, and sets a pixel value at the peak of the product to one of the reference values.

10. A mobile terminal device as claimed in claim 7, wherein the error coefficient used when calculating the i-th reference value is a value proportional to an absolute value of a difference between each pixel value and the nearest-to-the-pixel-value reference value among the reference values up to the (i−1)-th reference value.

* * * * *